United States Patent [19]
Meurer et al.

[11] Patent Number: 5,738,052
[45] Date of Patent: Apr. 14, 1998

[54] COMPOSITE CAMSHAFT FOR INTERNAL COMBUSTION ENGINE

[75] Inventors: Josef Meurer, Troisdorf, Germany; Edmund Lenerz, Hatfield Peverel, England; Hans-Walter Metz, Pulheim; Gottfried Weber, Cologne, both of Germany

[73] Assignee: Ford Global Technologies, Inc., Dearborn, Mich.

[21] Appl. No.: 659,468

[22] Filed: Jun. 3, 1996

[30] Foreign Application Priority Data

Jun. 2, 1995 [DE] Germany .......................... 195 20 306.2

[51] Int. Cl.$^6$ ........................................................ F01L 1/04
[52] U.S. Cl. ........................................... 123/90.6; 74/567
[58] Field of Search ............................. 123/90.6, 90.17, 123/90.31, 90.34; 74/567; 29/888.1

[56] References Cited

U.S. PATENT DOCUMENTS

| | | | |
|---|---|---|---|
| 4,774,852 | 10/1988 | Matt | 123/90.6 |
| 4,809,562 | 3/1989 | Bendoraitas et al. | 123/90.6 |
| 4,922,785 | 5/1990 | Arnold et al. | 123/90.6 |
| 5,307,708 | 5/1994 | Matt | 123/90.6 |
| 5,664,463 | 9/1997 | Amborn et al. | 123/90.6 |

FOREIGN PATENT DOCUMENTS

| | | |
|---|---|---|
| 3128522A1 | 2/1983 | Germany. |
| 3321846A1 | 12/1983 | Germany. |

*Primary Examiner*—Weilun Lo
*Attorney, Agent, or Firm*—Jerome R. Drouillard

[57] ABSTRACT

A composite camshaft for an internal combustion engine, having a shaft member (2) on which cam members (12, 13, 14 and 15) are firmly secured by the interposition of a clamping sleeve (16), between an external tooth system (17) and an internal tooth system (19).

6 Claims, 3 Drawing Sheets

COMPOSITE CAMSHAFT FOR INTERNAL COMBUSTION ENGINE

BACKGROUND OF THE INVENTION

1. Field of the Invention

The present invention relates to a composite camshaft, particularly for internal combustion engines, comprising a shaft member on which a plurality of cam members are firmly secured, in each case with interposition of a clamping sleeve.

2. Description of the Prior Art

A control shaft for internal combustion engines in which a plurality of cam members is securely fitted on a shaft member, in each case with interposition of a conical clamping sleeve, is already known from German Offenlegungssschrift 31 28 522.

In the known control shaft for an internal combustion engine, the shaft is a control shaft for a fuel injection pump on which fuel cams are fixed in a predetermined, angularly adjustable configuration.

Accordingly, both the area receiving the cam members and the internal bore of the cam members are made completely circular, so that any desired angular position can be realized by means of a conical clamping sleeve.

For a camshaft for internal combustion engines, such a nonpositive connection between the shaft member and the cam members is not sufficiently torsion-resistant, and from the assembly point of view, can only be realized with extreme difficulty.

German Offenlegungsschrift 33 21 846 discloses a composite camshaft in which a plurality of longitudinally-extending projections or grooves are provided on a shaft member, and the cam members are provided with corresponding grooves or projections which respectively ride on corresponding projections on the shaft member or project into the corresponding grooves on the shaft member, thus furnishing a positive connection between the shaft member and the cam members. In this case, the number of the projections or grooves corresponds to the number of cylinders of the engine, or a portion thereof. The fastening of the cam members on the shaft member can be effected by press-fixing, or a welding operation can be performed after the positive association to fix the cam members. This known composite camshaft has the disadvantage that, in the case of a press-fixing, the axial sliding of the cam members onto the shaft member can, on the one hand, sometimes give rise to swerve, and on the other hand, increased stresses can occur in the cam members. Because of the grooves or projections, a direct bearing arrangement of the camshaft on its outer circumference is not possible, so that mounting must be effected through slip-on bearing bushings, which lead to greater bearing diameters and thereby to increased friction losses.

SUMMARY OF THE INVENTION

It is an object of this invention to provide an improved composite camshaft for internal combustion engines in which a robust, positive connection is furnished between the shaft member and the cam members, and simple assembly of the cam members on the shaft member is made possible by a resilient clamping sleeve. Moreover, the required angular position of each individual cam member relative to the shaft member can be achieved in a simple manner. The external diameter of the tube should preferably be employed directly as the bearing diameter, thereby avoiding the need to attach separate bearing bushes.

To this end, according to the invention, in a composite camshaft for internal combustion engines comprising a shaft member on which a plurality of cam members are securely fitted, in each case with interposition of a clamping sleeve, the shaft member, preferably in the form of a hollow shaft and preferably of finished part quality, has a corrugated external tooth system formed in the cam-receiving regions, the cam members, preferably as sintered parts of finished part quality, are formed with a partially formed corrugated internal tooth system on their internal bores, and the clamping sleeves are formed as slit or two-part clamping sleeves having a corrugated profile cooperating with the corresponding external and internal tooth systems.

Forming the shaft and cam members in this way provides, on the one hand, the possibility of simple, flexible assembly and, through the elastic clamping sleeve, also effects a desired damping of the shocks which occurs in operating the valves of an internal combustion engine.

Advantageously, the corrugated external tooth system on the shaft member is formed inwards from the outer circumference of the shaft member by roll forming, or the like, and the outer circumference constitutes the conventional bearing positions. The partial internal tooth system on the internal bores of the cam members is advantageously axially continuous and may, for example, be formed by reaming. In another embodiment, the partial internal tooth system on the internal bores of the cam members is formed, e.g., by sintering, and is axially limited so that the internal bore secures the axial position of the cam members in one direction.

The cam members may be widened at the base to improve the centering, and the cam members may then be axially fixed on the shaft member by plastic deformation at one of their widened base portions.

BRIEF DESCRIPTION OF THE DRAWINGS

The invention will now be described in more detail, by way of example, with reference to various embodiments shown in the accompanying drawings, in which.

DESCRIPTION OF THE PREFERRED EMBODIMENTS

Figure 1:
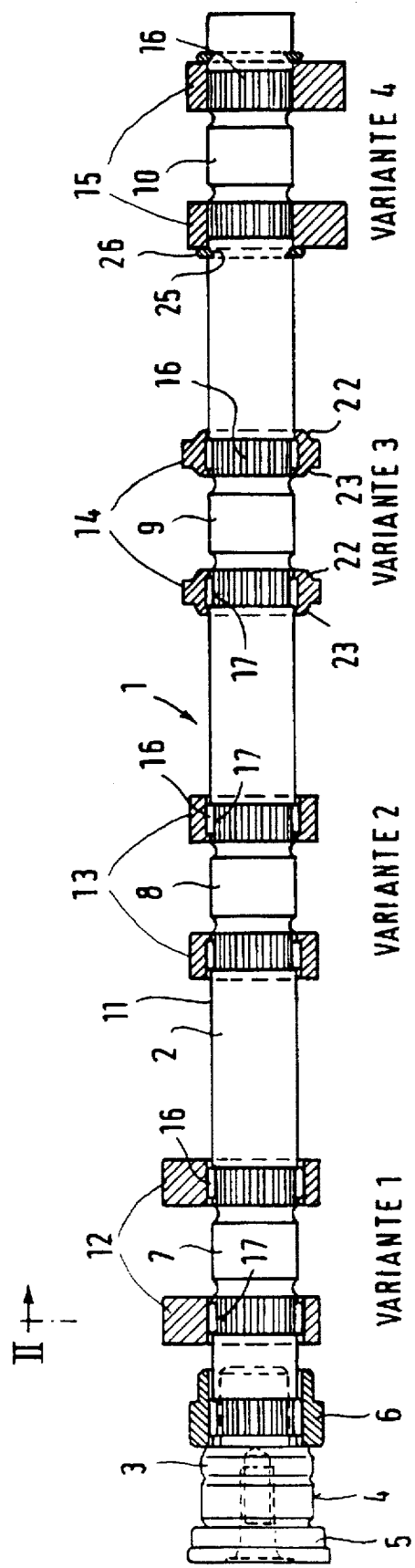
FIG. 1 is a view of a composite camshaft, particularly for internal combustion engines, in accordance with the invention, in which cam members are shown in section.

In FIG. 1, a composite camshaft 1 for an internal combustion engine is shown in a side view. Camshaft 1 can be made either of solid or tubular material. In the present embodiment, the camshaft 1 is made from a hollow, tubular shaft member 2, in one end of which a shaft member 3 is inserted on which main bearing 4 is formed. Camshaft 1 is fixed axially between a flange 5 for securing a drive wheel and an externally fitted collar member 6 which can, for example, also carry a control cam for the ignition or fuel injection.

The other bearing positions 7, 8, 9 and 10 are preferably formed by the outer circumference 11 of the shaft member 2.

The securing of the securing flange 5 and the collar part can be effected in a conventional manner, but it is, of course, also possible to effect the securing in accordance with the invention in the same way as is described below for the cam members.

On the shaft member 2 are attached cam members 12, 13, 14 and 15, for example, in pairs. Their fastening differs in minor details, which will be explained below with reference to the embodiments called variant 1, variant 2, variant 3, and variant 4.

Figure 2:
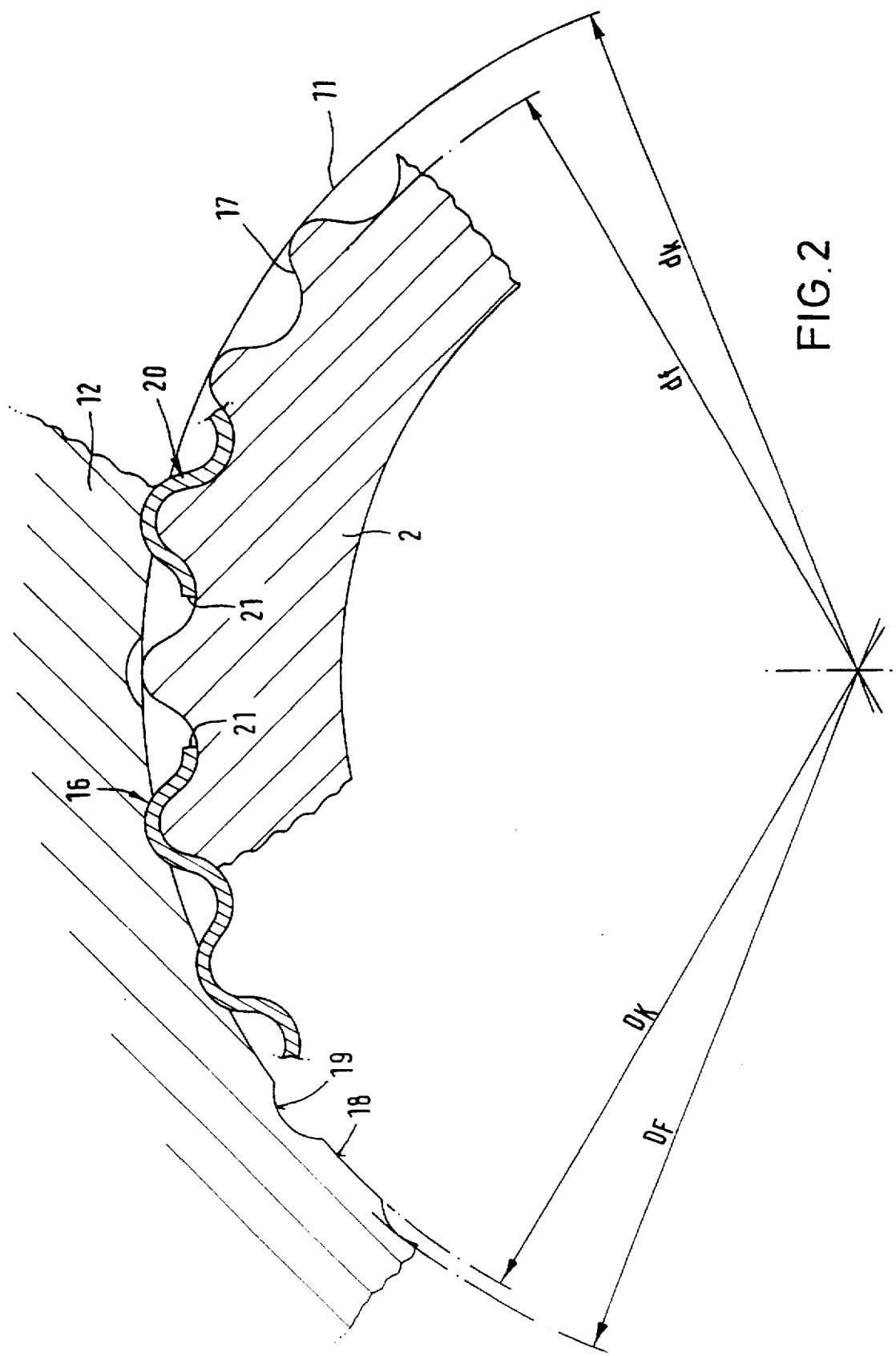
FIG. 2 is a partial section on a larger scale along the line II—II in FIG. 1, through a cam member fastening in accordance with the invention.
Figure 3:
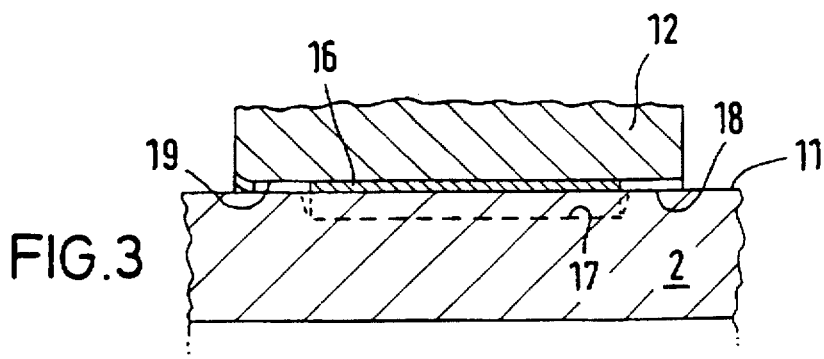
FIG. 3 is a partial section through the cam member fastening according to variant 1 in FIG. 1.
Figure 4:
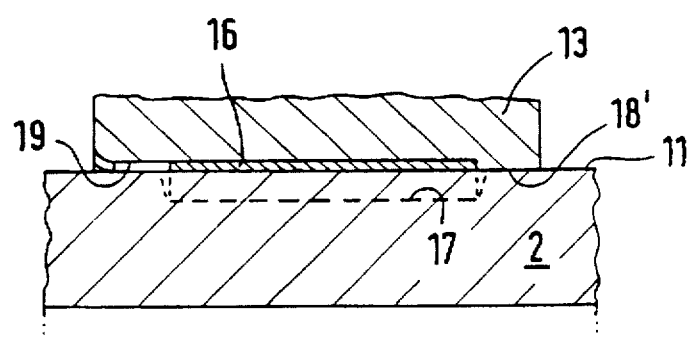
FIG. 4 is a partial section through the cam member fastening according to variant 2 in FIG. 1.
Figure 5:
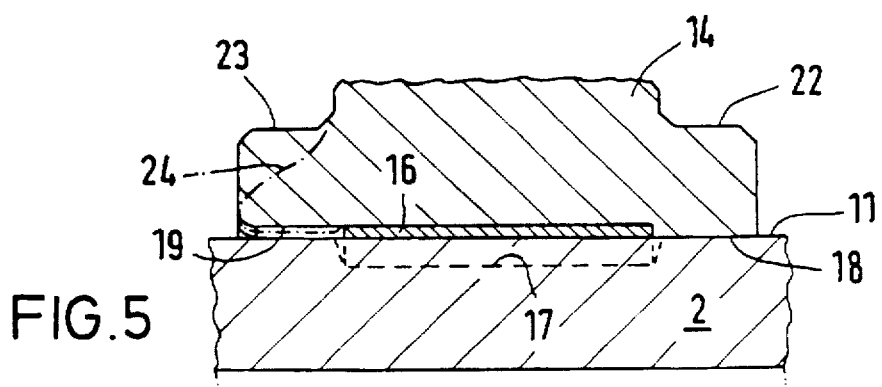
FIG. 5 is a partial section through the cam member fastening according to variant 3 in FIG. 1.

Between shaft member 2 and cam members 12, 13, 14 and 15, there is in each case a split clamping sleeve 16 with a corrugated profile; these produce a nonrotatable, positive connection between shaft member 2 and cam members 12, 13, 14 and 15, and their construction is described in still more detail with reference to FIG. 2.

As can be seen from FIG. 2, on the tubular shaft member 2 a corrugated external tooth system 17 is formed, of which the root circle is indicated by the arrow $d_f$ and the tip circle is indicated by the arrow $d_k$, the tip circle being smaller than or equal to the diameter of the outer circumference 11 of shaft member 2.

Cam members 12 are provided on their internal bores 18 with a corresponding internal tooth system 19 which corresponds to a partial region of a corrugated tooth system, of which the tip circle is indicated by the arrow $D_k$ and the root circle by the arrow $D_f$.

Between the shaft member 2 and the cam members 12, a split clamping sleeve 16 is fitted which has a corrugated profile 20, and of which the free ends in the region of the slit are indicated in the middle of FIG. 2 by 21. The clamping sleeves 16 may be made from steel strip or strip of a formable material such as aluminum or plastic material.

As can be seen from FIG. 1, for the cam member fastening in accordance with the invention shown in FIG. 2, there are four possible variants, differing in detail, which are described more fully with reference to FIGS. 3 to 6.

In the cam member fastening shown in variant 1 (see FIG. 3), the corrugated external tooth system 17 on the shaft member 2 is produced, for example, by roll forming, inside the external circumference 11 of the shaft member 2. The partial internal tooth system 19 formed on the internal bore 18 of the cam member 12 is formed continuously over the whole width of the cam member 12, e.g., by reaming. Centering of the cam member 12 on the shaft member 2 takes place over the tip circle $D_k$ Of the cam member 12 on both sides on the external circumference 11.

In the embodiment shown in variant 2 (see FIG. 4), the corrugated external tooth system 17 is again formed inside the outer circumference 11 of the shaft member 2, but the partial tooth system 18 is not formed over the whole width of the cam member 13, but a last section of the internal bore 18' forms a closed centering on the outer circumference 11 of the shaft member 2 and an axially one-sided positional fixing. Such cam members 13 can be manufactured in a simple manner by sintering.

In the embodiment shown in variant 3 (see FIG. 5), compared with the two variants 1 and 2, the only difference is that the cam members 14 are provided with lateral widenings 22 and 23 by means of which the cam members 14 can be better guided on the shaft member 2. By partial deformation 24 on one of the widenings 22, undertaken, e.g., at three positions distributed around the circumference (see the chain line), a bilateral axial position fixing for the clamping sleeve can be achieved.

Figure 6:
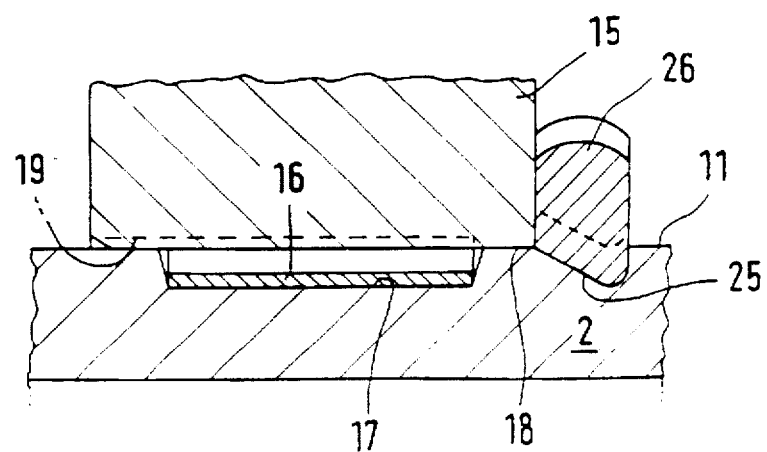
FIG. 6 is a partial section through the cam member fastening according to variant 4 with an additional possible means of axial fastening.

Variant 4, shown in FIG. 6, is similar to variant 2, except that here a means of axial fixing comprising a plastically deformable securing ring 26 in an annular groove 25 is shown.

While the invention has been shown and described in its preferred embodiments, it will be clear to those skilled in the arts to which it pertains that many changes and modifications may be made thereto without departing from the scope of the invention.

We claim:

1. A composite camshaft for combustion engines, comprising:

a shaft member (2) having a corrugated external tooth system (17) formed in a plurality of cam-receiving regions;

a plurality of cam members (12, 13, 14 and 15) mounted upon the shaft member, with each cam member having a partially formed corrugated internal tooth system on an internal bore (18) thereof; and a plurality of clamping sleeves (16), with each formed as a split sleeve (16) having a corrugated profile (20), and with each clamping sleeve interposed between and cooperating with the corresponding external and internal tooth systems (17 and 19) of said shaft member and a respective one of said cam members.

2. A composite camshaft according to claim 1, wherein the corrugated external tooth system (17) formed on the shaft member (2) is formed from the outer circumference (11) of the shaft member (2) inwards by roll forming, and the outer circumference (11) comprises conventional bearing positions (7, 8, 9 and 10).

3. A composite camshaft according to claim 1, wherein the partial internal tooth system (19) formed on the internal bores (18) of the cam members (12) is formed axially and continuously.

4. A composite camshaft according to claim 1, wherein the partial internal tooth system (19) on the internal bores (18) of the cam members (13) is formed, by sintering, in an axially limited manner, so that the internal bore (18) secures the axial position of the cam member (13) in one direction.

5. A composite camshaft according to claim 1, wherein cam members (14) are provided with widened portions (22 and 23) at their base.

6. A composite camshaft according to claim 5, wherein cam members (14) are axially fixed on shaft member (2) at one of their widened base portions (22 and 23) by plastic deformation (24).

* * * * *